Patented Oct. 5, 1937

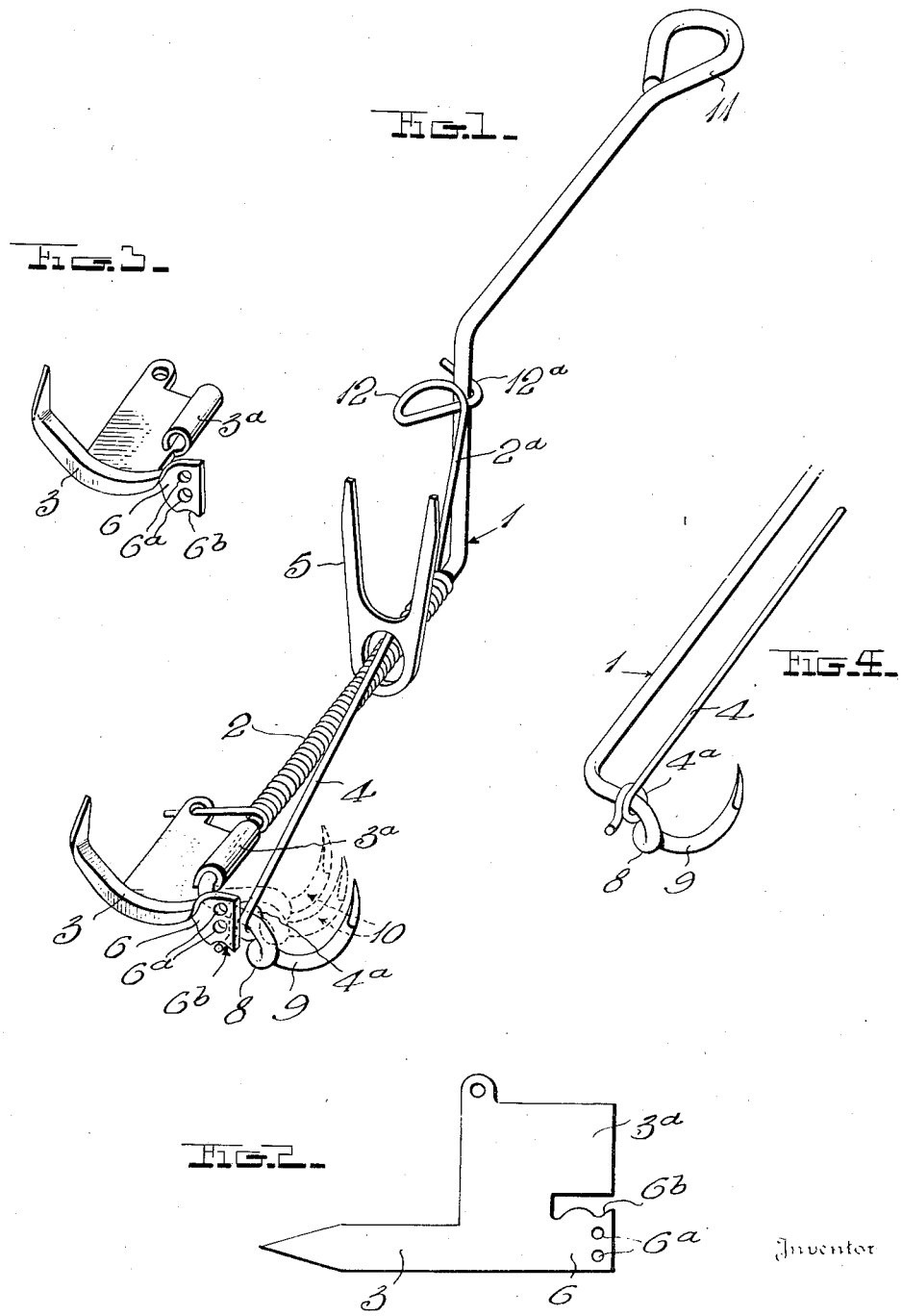

2,095,101

UNITED STATES PATENT OFFICE 2,095,101

TRAP

Judson C. Pewther, Wichita, Kans.

Application October 7, 1935, Serial No. 43,942

5 Claims. (Cl. 43—91)

This invention relates to traps and more particularly to traps designed for use in catching burrowing animals. Traps of this character have to be inserted in burrows and one of the objects of this invention is to provide a trap which may be set within a burrow, with the jaws fitting out snugly against the walls of the burrow.

A further object of my invention is to provide an adjustable animal trap which will be inexpensive to manufacture, yet practical and convenient in use.

Another object of invention is to provide an animal trap of this class which can be manufactured in a standard size, yet which will fit into burrows of various sizes.

The invention consists in improving the animal trap disclosed in United States Patent No. 1,222,024, issued to me April 10, 1917.

In order that my invention may be better understood I will state some facts as I know them. The gopher has been brought under control in most places in Kansas and several middle western States through the use of a trap constructed in accordance with the invention shown in my patent described above. In some regions, however, there are extra large gophers, and in the sand hills a very small gopher is found, while moles abound almost everywhere.

In using traps of the type described herein, it is essential that the trap approximately fit into the burrow. In using the old-type trap in the past, it was found that when a burrow was small, enlarging it enough to receive an average size trap would give a small animal room to turn cross-ways or assume some other position in which its body would not be between the jaws when they close. In a large burrow the trap would fit loosely, the jaws projecting into the burrow, obstructing the free passage of the animal so that the animal would often refuse to pass between the jaws. Experience has shown that a trap which snugly fits the burrow will be 20% to 30% more efficient than when the trap is either too large or too small.

The trap shown herein is constructed for large, medium, or small gophers, as well as moles, while under the old type of structure it was necessary to use three different sizes of traps to secure the same range.

The novel features of the invention will hereinafter be definitely claimed.

In order that my invention may be the better understood, I will now proceed to describe the same with reference to the accompanying drawing, wherein Figure 1 is a view in perspective of a trap constructed in accordance with an embodiment of my invention with the jaws in set position and with second and third position indicated by dotted lines.

Figure 2 is a view of the preliminary sheet metal blank from which jaw 3 is formed.

Figs. 3 and 4 are detail perspective views.

The main frame member 1 of the trap is formed from a single metal rod whose front end is bent laterally and curved to form one jaw 9, the rear end portion of the rod being upwardly offset and having an eye 11 in the present disclosure, for use in anchoring the trap. A second jaw 3 is stamped from the sheet metal blank shown in Fig. 2 and is provided with a tubular bearing $3^a$ surrounding the rod 1 directly behind the jaw 9. The front end of a coiled torsional spring 2 is suitably connected with the jaw 3, the rear end of said spring being provided with an integral arm $2^a$ which is used to wind and tension the spring in readiness for operation and to release tension on said spring when setting the trap. Toward its free end, the arm $2^a$ is provided with a laterally bent loop portion 12 and with a laterally bent hook portion $12^a$. The hook portion $12^a$ is engageable with the upwardly offset rear end of the rod 1 to hold the spring 2 tensioned for operation, and the handle 12 is instrumental in releasing said hook when the spring is to be relieved of tension preparatory to setting the trap. After setting, handle 12 is of course also used to again swing the arm $2^a$ to spring-wound position, allowing re-engagement of the hook $12^a$ with the rod.

A latch lever 4 is fulcrumed near its front end upon the inner end portion of the jaw 9, said latch lever being preferably provided with a coil $4^a$ loosely surrounding said end portion of said jaw. This jaw is provided with a suitable stop 8, shown in the form of a coil, to prevent sliding of the eye $4^a$ from said jaw. The jaw 3 is provided with a small plate portion 6 disposed in a plane in front of and at right angles to the rod 1, said plate portion being provided with a plurality of spaced abutments which are selectively engageable with the front end of the latch lever 4 to hold the jaws 3 and 9 in any of various spaced relations, as indicated by the dotted lines 10. These abutments are preferably formed by the edges of openings $6^a$ and a notch $6^b$ formed in the plate portion 6. A suitable trip plate 5 is slidable along the spring 2 and engageable with the rear end of the latch lever 4 to hold the latter in set position, and when said latch lever is in this position, the jaws 3 and 9 will be held in one spaced relation or another, according to whether the front end of said lever be engaged with one opening 6ª or another, or with the notch 6ᵇ.

In operation the winding handle 12 is released from engagement with frame 1. The spring is allowed to rotate backward releasing all tension on jaw 3. The jaws are then spread to the desired width to snugly fit into the burrow of a burrowing animal. The jaws are secured in the desired position by placing the tip of latch lever in the appropriate catch at 6. The latch lever is secured in position by passing it through the hole in trip plate 5. Then winding lever 12 is pulled around and hooked to frame 1 to tension the spring. Trip plate 5 is adjusted finally near the end of the latching lever 4 so that the trap readily springs when trip plate 5 is actuated by contact with a burrowing animal.

From the foregoing description it is thought to be obvious that I accomplish the objects of my invention in an extremely desirable and inexpensive manner. I do not wish to limit myself to the precise structure shown herein except as I may be limited by the following claims.

I claim:

1. A trap comprising two cooperable spring-actuated jaws, a latch lever fulcrumed on one of said jaws, the other of said jaws being provided with a plurality of spaced abutments selectively engageable with said latch lever to hold the jaws in any of various spaced relations when said latch lever occupies a set position, and animal-released means for holding said latch lever in said set position.

2. A trap comprising two cooperable spring-actuated jaws having a pivotal axis, a latch lever fulcrumed on one of said jaws, the other of said jaws being provided with a plate portion disposed in a plane at right angles to the pivotal axis of the jaws, said plate portion having a plurality of spaced abutments selectively engageable with said latch lever to hold the jaws in any of various spaced relations when said latch lever occupies a set position, and animal-released means for holding said latch lever in said set position.

3. A trap comprising a rod having one laterally curved jaw rigidly carried by its front end, a second curved jaw cooperable with said one jaw and having a bearing surrounding said rod behind said one jaw, a coiled jaw-actuating spring surrounding said rod, the front end of said spring being connected with said second jaw and the rear end of said spring being connected with said rod, a latch lever fulcrumed near its front end on the inner end portion of said one jaw, said second jaw being provided with a plurality of spaced abutments selectively engageable with said front end of said latch lever to hold the two jaws in any of various spaced relations when said latch lever occupies a set position in which it extends longitudinally of said spring, and animal-released means engageable with the rear end of said latch lever for holding it in said set position.

4. A trap comprising a rod having one laterally curved jaw rigidly carried by its front end, a second curved jaw cooperable with said one jaw and having a bearing surrounding said rod behind said one jaw, a coiled jaw-actuating spring surrounding said rod, the front end of said spring being connected with said second jaw and the rear end of said spring being connected with said rod, said second jaw being provided with a plate portion disposed in a plane in advance of said rod and at right angles to said rod, a latch lever fulcrumed near its front end on the inner end portion of said one jaw, said plate portion being provided with a plurality of spaced abutments selectively engageable with said front end of said latch lever to hold the two jaws in any of various spaced relations when said latch lever occupies a set position in which it extends longitudinally of said spring, and animal-released means engageable with the rear end of said latch lever for holding it in said set position.

5. In a spring-actuated trap, two pivotally connected jaw-carrying members, two coacting jaws projecting laterally from said jaw-carrying members respectively, a latch lever fulcrumed on one of said jaws, the other of said jaws being provided with a plurality of spaced abutments selectively engageable with said latch lever to hold the jaws in any of different spaced relations when said latch lever is held in set position, and animal-released means for holding said latch lever in said set position.

JUDSON C. PEWTHER.